Patented Oct. 16, 1923.

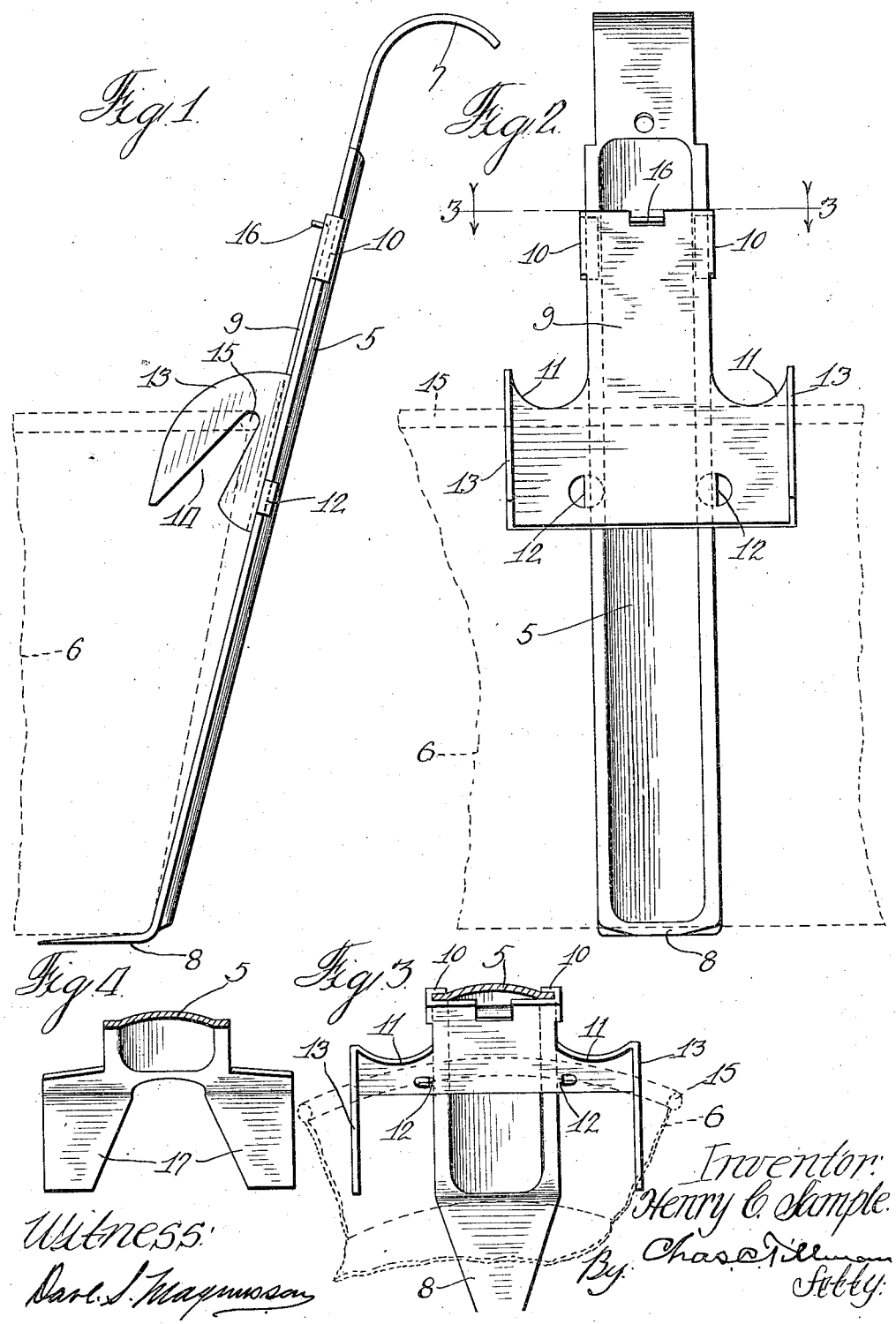
Oct. 16, 1923.
H. C. SAMPLE
LIFTER FOR CULINARY UTENSILS
Filed April 28, 1922
1,471,005

1,471,005

UNITED STATES PATENT OFFICE.

HENRY C. SAMPLE, OF CHICAGO, ILLINOIS.

LIFTER FOR CULINARY UTENSILS.

Application filed April 28, 1922. Serial No. 557,050.

*To all whom it may concern:*

Be it known that I, HENRY C. SAMPLE, a citizen of the United States, and a resident of Chicago, county of Cook, and State of Illinois, have invented certain new and useful Improvements in Lifters for Culinary Utensils, of which the following is a specification.

This invention relates, generally, to improvements in lifting devices, and particularly, to such devices designed for use in handling, moving and lifting culinary or kitchen utensils, such as pans, pie-plates, casseroles, sauce-pans, kettles and the like, especially when they are hot or soiled, to protect the hands from burns and soil, and it consists in certain peculiarities of the construction, novel arrangement and combination of the various parts thereof as will be hereinafter more fully set forth and specifically claimed.

The principal object of the invention is, to provide a handy lifter of the above named character, which shall be simple and inexpensive in construction, strong, durable and efficient in operation, with its parts so made and co-operating with one another as to be adapted for use on vessels or utensils of different sizes and heights.

Another object is the provision in a lifter of means for automatically engaging the rim or upper edge of a vessel in such a manner as to securely hold it upon a supporting portion of the lifter, to the end, that movement from place to place and lifting of the vessel may be steadily effected without applying the hands thereto.

Other objects and advantages of the invention will be disclosed in the following description and explanation.

In the accompanying drawing, which serves to illustrate an embodiment of the invention—

Figure 1 is a side or edge view of the lifter showing the parts thereof in about the positions they will occupy when engaging a vessel or cooking utensil shown by dotted lines.

Fig. 2 is a front face view of Fig. 1.

Fig. 3 is a plan view partly in section and partly in elevation, taken on line 3—3 of Fig. 2 looking in the direction indicated by the arrows, and Fig. 4 is a similar view of the lifter only, showing a modification in its construction.

Like numerals of reference refer to corresponding parts throughout the different views of the drawing.

The reference numeral 5 designates as a whole the handle of the lifter, which may be made of any suitable size and material, but preferably of metal and of an elongated shape as shown in Figs. 1 and 2 of the drawing. This handle or supporting member for a vessel or cooking utensil 6 has its upper end formed or provided with a hook 7 and at its other end with a forwardly extended wedge-shaped foot or member 8 adapted for insertion between the bottom of a vessel or utensil 6, and the object on which said vessel rests, such as a stove or the like.

As shown in Fig. 1, the member 8 of the handle 5 is extended from said handle at an angle thereto, and is tapered towards its front or free edge for the purpose of permitting said member to be easily inserted under the vessel or utensil. The handle 5 is by preference cross-sectionally curved throughout the major portion of its length, as will be understood by reference to Figs. 1 to 3 inclusive of the drawing, but has its edges located in the same plane. By thus cross-sectionally forming the handle 5, it is obvious that the strength of the handle will be augmented, thereby, and that as the concaved surface of the cross-sectionally curved portion of the handle is presented forwardly, the lower portion of said concavity will embrace or co-incide with the convexed portion of the lower part of the vessel, thereby causing it to be held against lateral movement with respect to the handle, that is, after the parts of the lifter have been placed in operative position with respect to the vessel, as is shown in Fig. 1 and will be hereinafter described.

Slidably mounted on the handle is a gripping or clamping member which consists of a substantially inverted T-shaped plate 9 having at the upper portion of each of its sides an inturned lip 10 to engage the side edges of the handle 5 for sliding movement thereon. The lower portion of the member 9 is widened as at 11, which widened portion is transversely disposed with respect to the handle and on the front surface thereof. Near its lower edge the widened part of the gripping member is provided on its rear surface at each edge of the handle 5, with a rearwardly and inwardly turned lip 12, which lips are by preference punched from the widened portion 11 of the plate 9 and engage the side edges of the handle 5 for slidable movement thereon.

The widened part 11 of the gripping member is provided at each of its ends with a forwardly extended flange 13, each of which has extended from its lower portion an upwardly tapered and outwardly inclined slot 14 for the reception of the rim or upper edge 15 of the vessel 6 or utensil. At its upper end the plate 9 is provided with a forwardly extended lug 16 by means of which the gripping member or plate 9 can be slid longitudinally on the handle in either direction, and also by means of which the slotted flanges 13 can be held in engagement with the rim or upper edge 15 of the vessel by pressing downwardly on the lug 16 with the thumb of the hand used for manipulating the device.

By preference, the lips 10 and 12 of the gripping member engage the sides of the handle 5 in such a way as to permit free movement of the gripping member so that after it has been raised upwardly on the handle, the member or foot 8 thereof can be readily inserted under the bottom of the vessel or utensil as shown in Fig. 1, when by releasing the thumb from the lug 16 of the gripping member, said member will be caused by its gravity to descend on the handle, thus causing the slots 14 of the flanges 13 to receive the rim of the vessel or utensil, in which position said flanges may be firmly held by applying downward pressure to the gripping member by means of the thumb on the lug or projection 16 of said member. When the parts have thus been arranged, it is apparent that the vessel will be securely clamped at its top and bottom, and also held against lateral movement with respect to the handle, by reason of the engagement of the lower curved portion of the handle with the correspondingly curved portion of the vessel or utensil. The vessel can now be lifted or moved from place to place by grasping the upper portion of the handle with the hand, in which operation it will be obvious that the hand will be prevented coming in contact with the vessel if the same is hot and will thereby be prevented injury by burns. The hooked portion 7 of the handle can be used for lifting pots and other bailed utensils by simply reversing the position of the lifter from that shown in Fig. 1 and inserting the hook 7 under the bail as is obvious.

In Fig. 4 I have shown a modification in the construction of the handle of the device which consists in providing the lower end thereof with a pair of forwardly extended and spaced feet or members 17 instead of the single foot or member as shown in Figs. 1 to 3 inclusive and above described. Otherwise the modified form of the lifter is of the identical construction as that shown and above described.

Having thus fully described my invention, what I claim as new and desire to secure by Letters Patent is—

1. In a device of the class described, the combination with an elongated handle having at one of its ends a forwardly extended member adapted for engagement with the bottom of a vessel, of a plate mounted on the handle for free longitudinal movement with respect thereto and having its lower portion widened and provided at each end of said widened part with a forwardly extended flange each of which has extended from its lower portion an upwardly tapered and outwardly inclined slot whereby said slotted flanges may be caused to engage the upper edge or rim of a vessel or utensil by gravity.

2. In a device of the class described, the combination with an elongated handle having at one of its ends a forwardly extended member adapted for engagement with the bottom of a vessel, said handle being cross-sectionally and rearwardly curved throughout the major portion of its length and having its edges located in the same plane, of a plate provided with rearwardly and inwardly extended lips to engage the side edges of the handle for free slidable movement thereon, said plate having its lower portion widened and provided at each end of said widened portion with a forwardly extended flange each of which has extended from its lower portion an upwardly tapered and outwardly inclined slot whereby said slotted flanges may be caused to engage the upper edge or rim of a vessel or utensil by gravity.

HENRY C. SAMPLE.